United States Patent [19]

Mariani et al.

[11] Patent Number: 5,854,932

[45] Date of Patent: *Dec. 29, 1998

[54] COMPILER AND METHOD FOR AVOIDING UNNECESSARY RECOMPILATION

[75] Inventors: Rico Mariani, Kirkland; Daniel R. Spalding, Redmond; Jonathan E. Caves, Redmond; Jan Gray, Redmond; Scott Randell, Redmond, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 516,321

[22] Filed: Aug. 17, 1995

[51] Int. Cl.$^6$ ........................................................ G06F 9/45
[52] U.S. Cl. ............................................................. 595/709
[58] Field of Search .................................. 395/705, 707, 395/708, 709

[56] References Cited

U.S. PATENT DOCUMENTS

| | | | |
|---|---|---|---|
| 5,204,960 | 4/1993 | Smith et al. | 395/707 |
| 5,325,533 | 6/1994 | McInerney et al. | 395/701 |
| 5,359,730 | 10/1994 | Marron | 395/712 |
| 5,428,786 | 6/1995 | Sites | 395/709 |
| 5,519,866 | 5/1996 | Lawrence et al. | 395/710 |
| 5,586,328 | 12/1996 | Caron et al. | 395/705 |

FOREIGN PATENT DOCUMENTS

| | | |
|---|---|---|
| WO95/00901 | 1/1995 | WIPO . |
| WO95/00902 | 1/1995 | WIPO . |
| WO95/00904 | 1/1995 | WIPO . |

OTHER PUBLICATIONS

Chambers, Dean, Grove, "A Framework for Selective Recompilation in the Presence of Complex Intermodule Depedencies", Proceedings ICSE–17 Workshop on Formal Methods Application in Software Engineering Practice, IEEE Comput. Soc. Tech. Committee on Software Eng., ACM SIGSOFT, pp. 221–230 (1995).

*Unix Power Tools,* Jerry Peek, Tim O'Reilly, Mike Loukides, pp. 384–385, 519–521, 1006, 1036,1065–1069, O'Reilly & Associates, Inc., 1993.

"Nmake" utility of Microsoft Visual C++, Bruce Greeley, Jun. 6, 1995.

*Silicon Graphic's Delta C++*, Theresa Williams, Jun. 6, 1995.

*Managing Projects with Make* , Andrew Oram, Steve Talbott, O'Reilly & Associates, Inc., 1991.

*Primary Examiner*—James P. Trammell
*Assistant Examiner*—Peter J. Corcoran, III
*Attorney, Agent, or Firm*—Klarquist Sparkman Campbell Leigh & Whinston LLP

[57] ABSTRACT

A minimal rebuild system and process for minimizing rebuilding of a user's programming project analyzes and records dependencies of object code files compiled in a previous build of the project on classes declared in header files. When rebuilding the project, the system detects and records changes made to the classes and header files since the project was last built. The system then determines whether to recompile the object code files from their respective source code files by comparing the recorded dependencies and changes. If an object code file's dependencies do not intersect the changes, recompiling of the object code file can be omitted. The minimal rebuild system utilizes an approximate representation of the dependencies to yield an efficient system while ensuring that the project is correctly rebuilt.

21 Claims, 7 Drawing Sheets

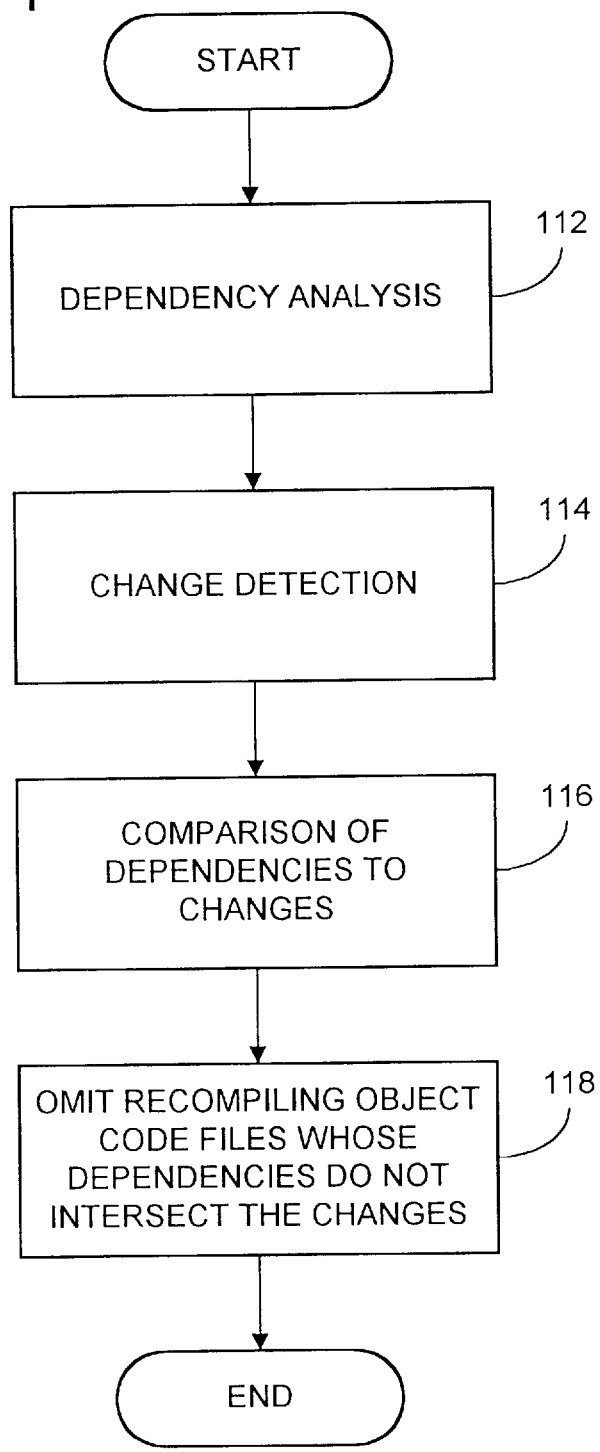

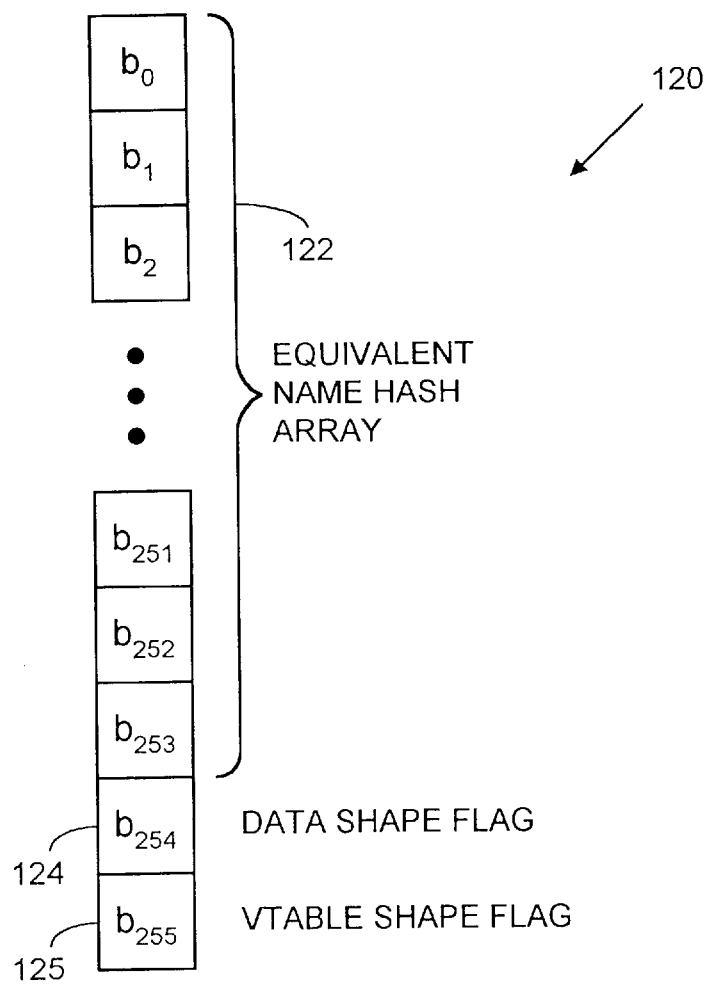

COMPILER AND METHOD FOR AVOIDING UNNECESSARY RECOMPILATION

FIELD OF THE INVENTION

This invention relates generally to compiling source code written in a high level programming language to build an executable program, and more particularly relates to minimizing rebuilding of the executable program after changes are made to the source code.

BACKGROUND OF THE INVENTION

Computers operate under the control of a program consisting of coded instructions. Typically, programs are first written in a high level programming language, such as BASIC, PASCAL, C, C++, or the like, which are more readily understood by humans.

One powerful form of high-level programming language is the object-oriented programming language. object-oriented programming generally refers to computer programs, programming languages and tools which utilize the concept of "objects." The term "object" generally refers to an instance of a programmer-defined data structure (the data or variables of which are referred to as the object's "properties") and functions that manipulate that structure (referred to as "member functions," "member procedures," or simply "members" of the object). In other words, objects are a combination of a data structure with a set of functions that perform methods on the data structure. The specification of the data structure and the methods of an object is referred to as a "class." Accordingly, every object is an instance of a class. Object-oriented programming concepts can be applied to programs formed with most any programming language, including C, Basic, and others. Various object-oriented programming languages, such as the C++ and Smalltalk programming languages, provide formal syntax by which object-oriented concepts may be more easily expressed (e.g., statements for declaring classes, etc.).

One benefit to the use of objects is that their members define a standard way for other program code to interact with or access the object's properties. A set of semantically related functions implemented on an object is generally referred to as an "interface" of the object. By allowing access to an object's members through an interface, the object effectively "exposes" its functionality for use by other application programs. For example, a simple object with a property, "Color," may have an interface which includes two members, "GetColor" and "SetColor," which manipulate that property. Other application programs which have access to this object's interface can make use of its functionality by calling the GetColor and SetColor members of that interface.

For a program to run on a computer, the high level programming language statements of the program are first translated or compiled into coded "machine" instructions which are executable by the computer. Typically, a software program known as a compiler is used for this purpose. The term "source code" generally refers to the form of a program prior to compiling, i.e., in its high level programming language. "Object code," on the other hand, generally refers to the program in the form of the coded instructions which are generated by the compiler and executable on a computer.

Processes for compiling source code into executable object code are well known in the art. In a typical previous compiler, the compiler initially performs lexical analysis on the source code to separate the source code into various lexical structures of the programming language (generally known as tokens), such as keywords, identifiers, operator symbols, punctuation, and the like. Then, through syntax analysis, the compiler groups the tokens into various syntax structures of the programming language, such as expressions, declaration statements, loop statements, procedure calls, and the like. Finally, the compiler generates and optimizes executable object code for each of these structures.

In some high level programming languages, e.g., C and C++, the source code of a program (also referred to as a "project") is generally written as multiple files. In C and C++, files with a ".c" or ".cpp" extension (known as "source code" files) contain code to implement sets of related functions, and/or class members. Files with a ".h" extension (known as "header" files) generally contain declarations of constants, data types, function prototypes and classes that are to be imported into one or more ".c" or ".cpp" source code files with a "#include" statement. These C or C++ source and header files (the "compilands") of a project are compiled into one or more object code files (generally having file names with a ".obj" extension) which, in turn, are linked together (possibly also with additional library files) to form the final executable program (generally a file having a name with a ".exe" extension). Each object code file typically is compiled from a single source code file and any number of header files that are included (with a #include statement or the like) by the source code file. The files (i.e., the source code file and header files included by the source code file) from which an object code file is compiled are referred to as the object code file's "compilands."

For typical high level programming languages, the process of compiling source code to executable object code is a complex and time consuming task. Depending on the length of a program's source code and the complexity of the programming language, compiling a program may take from many seconds to many minutes. Lengthy compile times, however, are inconvenient and disruptive to programmers. When developing a program, it is often necessary to repeat the compiling process many times to remove coding and design errors, and to add further features as the program evolves from prototype to finished product. Additionally, as the program evolves, the length of the program's source code and, consequently, the compile time, generally increase.

The duration of compile times can be particularly inconvenient during the process of debugging source code. When debugging a compiled program, a programmer typically makes a small change to the program's source code, compiles the program again, and tests its execution. Not uncommonly, these steps are performed repeatedly until the last error in the program is corrected. While the computer compiles the program, the programmer may be left idle. The time required for compiling therefore can be an aggravating, as well as time consuming, part of the process.

With many previous compilers, the compiling process begins anew each time a program is compiled. No part of the previously compiled object code is used. Instead, the compiler repeats the compilation process from the beginning on the entire source code. As a result, the length of compile time for a program can be substantially the same regardless of whether a small change or many major modifications were made to the source code.

One well known utility for reducing recompilation time of some compilers is known as "make." The make utility automates the building of an executable program from multiple compiland files. In general, the make utility receives as input a make file (typically having a file name with a ".mak" extension) which contains three categories of information: a list of object code files (the "targets"), a list of compiland files for each target (the target's "file dependencies"), and a list of commands for each target (the target's "recipe") that use the target's file dependencies to produce the target. The input make file can be manually written by the programmer. More recent compilers, however, provide tools for automatically generating a make file for a particular program or project from a list of compiland files for the program or project. The following Table 1 illustrates the information for an exemplary make file fragment.

TABLE 1

Exemplary Make File Information.

| Target File | Target's File dependencies | Target's Recipe |
|---|---|---|
| foo.obj | foo.cpp, shared.h | cl -c foo.cpp |
| bar.obj | bar.cpp, shared.h | cl -c bar.cpp |

The make utility operates to compile the various targets that are linked into an executable program by examining the file dependencies of each target to determine whether any of the file dependencies has changed since the target was last compiled. This determination can be made, for example, by comparing the date stamp of the target against the date stamps of the file dependencies. If any of the target's file dependencies has changed since the target was last compiled, the make utility executes the target's recipe to recompile the file dependencies to produce the target. For example, given the exemplary make file fragment illustrated in Table 1, the make utility would execute the recipe for the "foo.obj" target if either of its "foo.cpp" or "shared.h" file dependencies had changed since "foo.obj" was last compiled. Further, since shared.h is a file dependency of both foo.obj. and bar.obj, the recipes of both foo.obj and bar.obj will be executed if the shared.h file changed since these targets were last compiled. In this way, the make utility determines which targets are affected by a changed source code file, and causes only the affected targets to be recompiled.

The make utility reduces recompilation time by reducing the number of times that the compiler is run to rebuild an executable program. Frequently, only some of the source code files for an executable program are changed between compiles. Accordingly, after a typical revision of an executable program's source code files, the make utility saves a significant amount of recompilation time since only the object files that are dependent on the changed compiland file(s) are actually rebuilt.

The main drawback of utilities like "make" is that they often build more targets than is strictly necessary after certain common types of revisions to the compilands. In some cases, a target need not be rebuilt after a change to the target's file dependencies. When portions of a file dependency that are not used to compile the target are changed, the target generally need not be rebuilt. The typical prior make utility recompiles the target regardless of whether the change to the file dependency actually affects the target.

SUMMARY OF THE INVENTION

The present invention further reduces the number of object code files (or object modules) for an executable program that are recompiled after a revision by tracking each object code file's dependencies (hereafter "minimal rebuild dependencies") on portions of the contents of any header files (hereafter "included header files") that are included by the source code file from which the object code file is compiled. The portions of the contents of each header file that are changed after a revision also are detected (hereafter the "detected changes"). When the programmer initiates updating of an executable program, those object code files whose minimal rebuild dependencies do not intersect the detected changes are not recompiled. Accordingly, the number of object code files recompiled for an executable program after a revision is further reduced where changes are made to only those portions of the header files that are not used in compiling the object code file.

Ideally, information as to the exact contents of each included header file upon which an object code file depends is tracked and utilized as the basis for determining whether the object code file is recompiled. In general, however, tracking every way in which an object code file depends upon the various contents of its include header files may require an excessive amount of storage. Further, utilizing this information to determine that the included header file has changed in such a way that recompiling is needed also may require excessive processing time. In some cases, the time required to process the minimal rebuild dependencies information could exceed the processing time required to recompile the object code file. Tracking exact dependency information therefore is generally so inefficient as to be uninteresting to potential users.

The invention further provides a system and method to efficiently reduce recompiling of object code files with minimal storage and processing time requirements, while ensuring that the program is accurately rebuilt. The system and method utilizes approximate dependency information to identify compilands that need not be recompiled. Since exact dependency information is not tracked, the system according to the invention may recompile some object code files unnecessarily. However, the system is designed such that the number of unnecessary recompiles is minimized, while necessary recompiles are never omitted.

According to one aspect of the invention, for programs whose source code is written in an object-oriented programming language (e.g., C++), the minimal rebuild dependencies associated with an object code file include dependencies on classes declared in the header files. Each time a source code file is compiled, each use of a class declared in its included header files and the manner of use is recorded in a database for the project. This information is then available in a subsequent rebuild of the executable program to determine whether the detected changes intersect the object code file's minimal rebuild dependencies, and consequently whether the source code file is to be recompiled, thus creating a new object code file. Recording dependencies of object code files on classes in accordance with this aspect of the invention reduces the storage and processing time requirements of the minimal rebuild system. Classes in object-oriented programming languages tend to be used either extensively or not at all in compiling a particular object code file. Accordingly, classes are a useful unit of dependence for identifying unnecessary recompiles (i.e., situations in which a change to an object code file's file dependencies does not necessitate recompiling).

For example, the following Table 2 illustrates additional class dependency information tracked according to this aspect of the invention for the object code files in the exemplary make file fragment of Table 1.

TABLE 2

Class Dependency Information for Exemplary Make File Fragment.

| Object code file | Object code file's compilands | Contents of compilands | Object code file's class dependencies | Recipe |
|---|---|---|---|---|
| foo.obj | foo.cpp | various | all contents of foo.cpp | cl -c foo.cpp |
|  | shared.h | class A, class B | class A |  |
| bar.obj | bar.cpp | various | all contents of bar.cpp | cl -c bar.cpp |
|  | shared.h | class A, class B | class B |  |

As shown in column 2 of the above Table 2, the shared.h header file is a compiland of both foo.obj and bar.obj object code files. As described in the background of the invention, prior make utilities therefore will recompile both foo.obj and bar.obj object code files if the shared.h file changed since the program was last compiled. As shown in columns 3 and 4 of the above Table 2, however, the foo.obj object code file depends only on the declaration of class A in the shared.h file, while the bar.obj object code file depends only on the declaration of class B in the shared.h file. (These class dependencies of the foo.obj and bar.obj files are shown organized according to the respective header file of the classes in Table 2 for illustrative convenience. The class dependencies, however, need not be stored in an embodiment of the invention under such an organization.) If the shared.h file is edited so as to change only the class A declaration, then only the foo.obj object code file need be recompiled. Conversely, a change affecting only the class B declaration in the shared.h file necessitates recompiling only the bar.obj file. By tracking the class dependencies of the object code files and recompiling the object code files only if the changes to the source code files intersect the class dependencies in accordance with the above-mentioned aspect of the invention, unnecessarily recompiling one of these object code files is avoided in each of these two example situations. In practice, the number of unnecessary recompiles saved is even greater since programs may comprise several dozen object code files of which only one or two will need to be rebuilt.

According to another aspect of the invention, information of the dependency of object code files on some classes that are usually static is not tracked to further reduce the storage and processing time requirements for minimizing the number of object code files to be rebuilt. Instead, the object code files that depend on header files in which such classes are declared are always rebuilt when the header files have been changed since last building the program.

According to yet another aspect of the invention, minimal rebuild information as to the manner of use by each object code file of its class dependencies is tracked. In an exemplary embodiment of the invention, the information relating to the manner of use of the object code file's class dependency includes the names searched for in the class when compiling the object code file, as well as the object code file's dependence on the shape of data in the class and the shape of the virtual function table (hereafter "vtable") of the class. Recompiling of the object code file is omitted if the only changes to a class dependency do not affect the manner of use of the class by the object code file.

Further, in the exemplary embodiment of the invention, the names searched for in the object code file's class dependency are tracked using a hash table. The hash table records that names having particular hash results (herein referred to as "equivalent names") were searched for in the class, rather than the searched-for names themselves. This significantly reduces the amount of storage required to represent the names that are searched for in the class to compile the object code file, while continuing to ensure that the program is correctly rebuilt. Occasionally, where a searched-for name dependency and a different changed name of a class both have a same hash result, the searched-for name dependencies information stored in the hash table will indicate a need to recompile the object code file when recompiling may be unnecessary. However, storing the searched-for name dependencies using the hash table will always indicate that the object code file is to be recompiled when recompiling is necessary.

According to a further aspect of the invention, information of the dependency of object code files on some names that are commonly searched for in many classes (e.g., commonly used data type identifiers such as "BOOL," "DWORD," and "WORD") are not traced to further reduce the storage and processing time requirements for minimizing the number of object code files to be rebuilt. Instead, when such a name is introduced or removed from a class declaration, then all object code files having a dependency on the file in which the class is declared are rebuilt.

According to yet a further aspect of the invention, information generated by the compiler to refer to the source code files from which an object code file is compiled (e.g., browser and debugger information which refers to particular line numbers of a source code file from which particular code in an object file was generated) is updated when recompiling of the object code file is omitted based on its minimal rebuild dependencies (which causes the information to become stale or invalid). To facilitate this updating in the exemplary embodiment of the invention, the information is organized according to the source code file to which it refers.

Additional features and advantages of the invention will be made apparent from the following detailed description of an exemplary embodiment which proceeds with reference to the accompanying drawings.

BRIEF DESCRIPTION OF THE DRAWINGS

FIG. 4 is a flow diagram of the general operation of the minimal rebuild system of FIG. 3.

FIG. 5 is a block diagram illustrating a data structure utilized in the minimal rebuild system of FIG. 3 to represent an object code file's class dependencies and changes to a class.

DETAILED DESCRIPTION OF THE EXEMPLARY EMBODIMENTS

Figure 1:
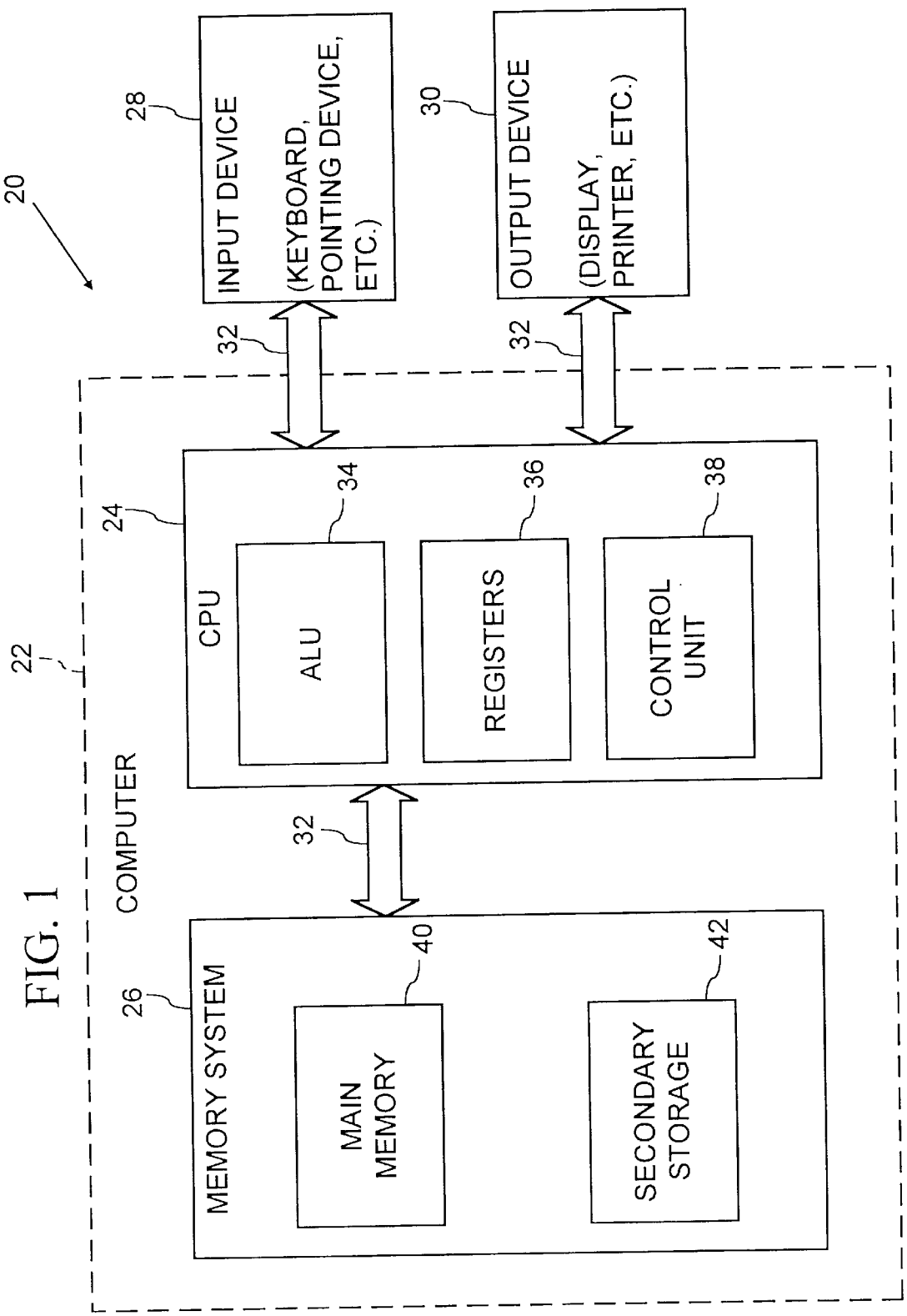
FIG. 1 is a block diagram of a computer system that may be used to implement a method and apparatus embodying the invention for minimizing recompiling of an executable program.

Referring to FIG. 1, an operating environment for an exemplary embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The preferred realization of CPU 28 is a Pentium processor manufactured by Intel (or other x86 family or compatible processor), but a variety of other suitable processors, including those from Digital Equipment, Sun, MIPS, Motorola, etc., can alternatively be used.

The memory system 26 includes main memory 40 and secondary storage 42. Illustrated main memory 40 takes the form of 16 megabytes of semiconductor RAM memory. Secondary storage 42 takes the form of long term storage, such as ROM, optical or magnetic disks, flash memory, or tape. Those skilled in the art will recognize that memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system. The operating system is the set of software which controls the computer system's operation and the allocation of resources. The operating system is resident in the illustrated memory system 26.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 24 of electrical signals representing data bits and the maintenance of data bits at memory locations in memory system 26, as well as other processing of signals. The memory locations where data bits are maintained are physical locations that have particular electrical, magnetic, or optical properties corresponding to the data bits.

Overview of the Development Environment

The present invention is illustrated in the context of Microsoft Corporation's Visual C++® programming language system and development environment (hereafter "Visual C++"). For a complete discussion of Visual C++, see Inside Visual C++, by David J. Kruglinski, Microsoft Press, 1994. A brief overview of part of the general operation of the Visual C++ system and associated terminology is provided below before discussing the details of the exemplary embodiments.

Figure 2:
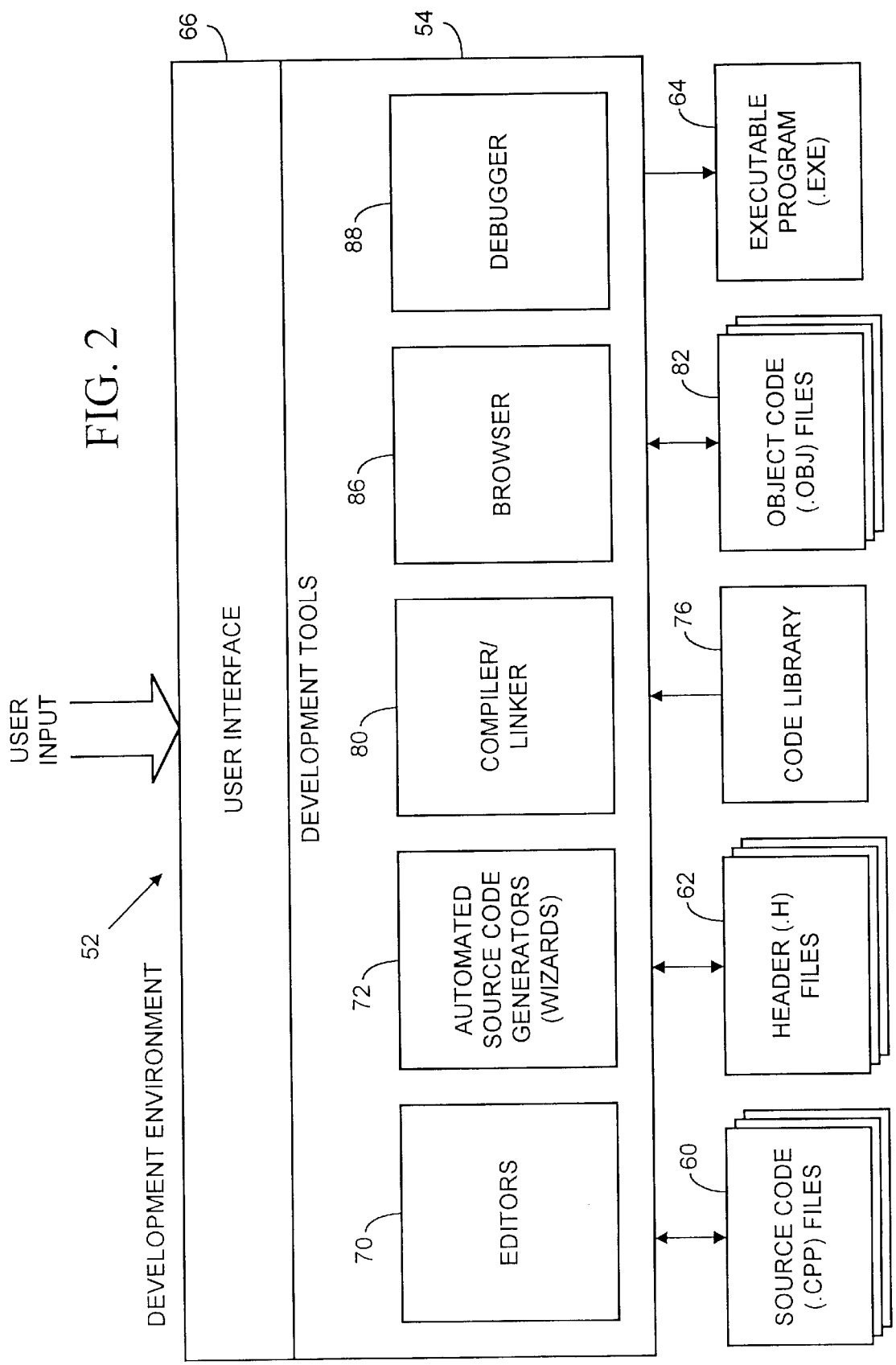
FIG. 2 is a block diagram illustrating a development environment within a computer system such as shown in FIG. 1.

Referring to FIG. 2, Visual C++ provides a development environment 52 which includes various tools 54 for creating, editing, and compiling source code files 60 and header files 62 for a user's programming project which is to be implemented in an executable program 64. The user or programmer interacts with the development environment through a user interface 66, which preferably provides graphical controls, such as windows, menus, lists, scroll bars, buttons, dialog boxes, etc., which the user can activate through use of the input device 28 (FIG. 1). The development tools 54 and user interface 66 preferably are implemented in software which executes on the computer system 20 (FIG. 1), and which is resident in the memory system 26 (FIG. 1).

For use in creating and editing the source code files 60 and header files 62 of the user's project, the development tools 54 of the environment 52 comprise one or more editors 70, and automated source code generators 72 (also known as "wizards"). With the editors 70, the user can directly modify or add C++ statements to the source code files 60 and header files 62. The wizards 72 automatically create or modify the source code files 60 and header files 62 based on the user's responses to a sequence of prompts and queries. The wizards 72 include "application wizards" which generate or modify a collection of source code files 60 and header files 62 to provide a basic framework of an application program, which the user can further edit to produce a customized application. The wizards 72 also include "class wizards" which generate or modify class declarations and source code in the source code files 60 and header files 62.

As a further aid in writing programs, the development environment 52 provides a code library 76 which includes source code for a collection of predesigned function and class declarations that can be incorporated or adapted (such as through class inheritance) into the user's program. The code library 76 of Visual C++ is the Microsoft Foundation Classes ("MFC") library which provides classes for operating under Microsoft Corporation's Windows and Windows NT operating systems. MFC also provides classes for interoperating with other application programs using Microsoft Corporation's Object Linking and Embedding version 2 (OLE 2) system, and classes for interfacing with database management systems. MFC further provides general purpose classes that define string, collection, and graphics objects. Classes in the code library 76 generally do not change. Users of the development environment 52 modify or adapt MFC classes to a particular program, if at all, by creating new classes using the editor 70 or class wizard 72 which alter the functionality of an MFC class through inheritance.

The development tools 54 further comprise a compiler and linker 80 for compiling the source code files 60 and header files 62 of the user's project into one or more object files 82 (also referred to as "targets"), and linking the object files to produce the executable program 64. The compiler and linker 80 employs well known techniques for compiling source code into object code, including lexical analysis, syntax analysis, code generation, and code optimization techniques.

The development tools 54 preferably also comprise a variety of other development tools, including browser 86, debugger 88, etc. The browser 86 is a tool that assists in navigating and searching through the various components (e.g., class, member, and data declarations) of a program's source code files 60 and header files 62. The debugger 88 is a tool that assists in analyzing the performance of a program and identifying errors. The browser 86 and debugger 88 utilize information generated by the compiler 80 as to the relationships between various components of the program's source code files 60 and header files 62.

Overview of the Minimal Rebuild System Architecture

Figure 3:
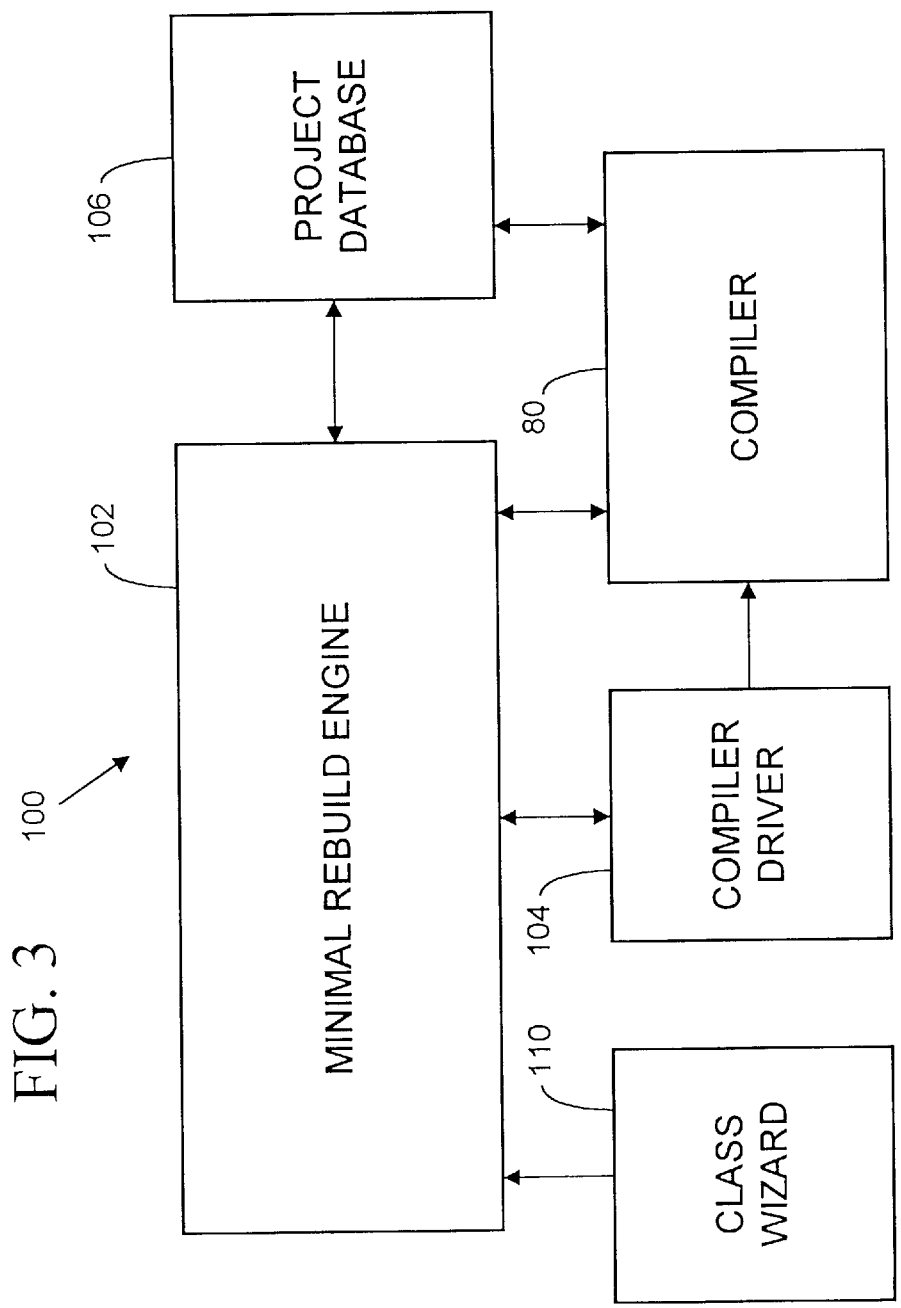
FIG. 3 is a block diagram illustrating a minimal rebuild system according to first and second exemplary embodiments of the invention within the development environment shown in FIG. 2.

Referring now to FIG. 3, a minimal rebuild system 100 according to the exemplary embodiments of the invention is integrated into the development environment 52 (FIG. 2). The minimal rebuild system 100 operates to reduce rebuilding of the executable program 64 (FIG. 2) by avoiding recompiling the source code files 60 (FIG. 2) and the header files 62 (FIG. 2) into the object code files 82 (FIG. 2) where any changes to the header files 62 do not affect the resulting object code files 82. As shown in FIG. 4, the minimal rebuild system 100 determines when recompiling can be avoided by determining how the object code files 82 are dependent on the header files 62 ("dependency analysis" 112), and detecting changes to the header files 62 ("change detection" 114). The minimal rebuild system 100 can then compare each object code file's dependencies with the detected changes ("comparison of dependencies and changes" 116) and avoid recompiling the object code file when the object code file's dependencies and the detected changes do not intersect (as shown at step 118).

In the exemplary embodiments of the invention, the minimal rebuild system 100 comprises a minimal rebuild engine 102, a compiler driver 104, a project database 106, a class wizard 110 (part of the automated source code generators 72 of FIG. 2), and the compiler 80 (also in FIG. 2). These components of the minimal rebuild system 100 preferably are implemented as software which executes on the computer system 20 (FIG. 1), and which is resident in the memory system 26 (FIG. 1).

In the minimal rebuild system 100, the minimal rebuild engine 102 maintains information as to the dependencies of the object code files 82 on the contents of the header files 62. The minimal rebuild system 100 is notified by the compiler 80 of dependencies ("file dependencies") of the object code files 82 (FIG. 2) on the source code files 60 and the header files 62, and of dependencies ("class dependencies") of the object code files 82 on class declarations in the header files 62. As each dependency of an object code file on the source code files 60 and the header files 62 is encountered during compiling into the object code file, the compiler 80 notifies the minimal rebuild system 100. The minimal rebuild system 100 stores the dependency information in the project database 106.

The minimal rebuild engine 102 further maintains information as to the changes made to the header files 62 since the user's project was last built. In a first exemplary embodiment of the invention, the minimal rebuild engine 102 is informed of changes to the header files 62 by the class wizard 110. Along with automated generation of the initial declarations of classes in the header files 62, the class wizard 110 also provides automated editing of class declarations. To make any of various standard edits to a class, the user invokes the class wizard 110 and responds to various prompts generated by the class wizard. Based on the user's responses, the class wizard 110 automatically edits the class's declaration in a header file (as well as the class's source code in a source code file). When the class wizard performs such automated edits to a class, the class wizard also notifies the minimal rebuild engine 102 which class was changed and how the class was changed. The minimal rebuild engine 102 stores information relating to the changes in the project database 106.

The class wizard 110 in the exemplary embodiment supports change detection (with notification to the minimal rebuild system 102) for at least the following standard edits to a header file: (1) add a new member function with a new name (never before used), (2) add an override of an existing virtual function, (3) add a new data member, (4) add a new class with a new name, and (5) add a new dialog, new menu, new string, etc. to a class declaration.

Performing change detection via the class wizard 110 has the advantage of simplifying change detection implementation. The class wizard 110 is designed to make only specific types of standard edits to classes. Accordingly, change detection in the class wizard 110 involves simply notifying the minimal rebuild engine 102 of the particular change that the user selects to have made, such as by a function call to the minimal rebuild engine 102 in the code module of the class wizard 110 that performs the selected change.

A drawback to performing change detection via the class wizard 110, however, is that the minimal rebuild system 102 is only notified of changes that are made utilizing the class wizard. However, the user also can make changes directly to the C++ statements in the source code files 60 and the header files 62 using the editors 70 (FIG. 2), or with other editing tools outside the development environment 52 (FIG. 2). To account for changes made outside the class wizard 110 (e.g., by the editors 70), the minimal rebuild engine 102 also tracks (i.e., stores) the date and time of the last change made to the header files 62 by the class wizard 110 (i.e., the "date stamp" generated by the operating system when the header file is saved subsequent to modification by the class wizard 110). Whenever the class wizard is invoked to make a change to a header file, the class wizard 110 notifies the minimal rebuild engine 102 which then compares the header file's current date stamp (which indicates the date and time it was last saved) to the previously stored date stamp of the last class wizard edit to that header file. After the comparison, the minimal rebuild engine 102 updates the stored date stamp of the last class wizard edit to that header file. The minimal rebuild engine 102 also compares the header file's current date stamp to the date stamp of the last class wizard edit when the user's project is to be rebuilt. If the comparisons in either of the above situations show that the header file has been saved since it was last modified by the class wizard 110, the minimal rebuild engine 102 concludes that the header file has been modified outside the class wizard 110. Since the manner in which the header file has been modified outside the class wizard is unknown, the entire contents of the header file is considered as possibly changed. Accordingly, the minimal rebuild system 102 recompiles all object code files 82 that are dependent on header files 62 detected as having been modified outside the class wizard 102. Consequently, for the header files 62 that are modified outside the class wizard, the minimal rebuild system 100 avoids no more recompiles than the prior make utilities discussed in the background of the invention.

In a second exemplary embodiment of the invention, the minimal rebuild engine 102 is informed of changes to class declarations in the header files 62 by the compiler 80. When compiling the header files 62, the compiler 80 generates a complete description (a "type record") of the structure of each class of the user's project, and stores the description in the project database 106. To track changes to header files outside of class declarations, the compiler 80 also generates a signature (e.g., a check sum or cyclic redundancy code ("CRC")) on the portions of the header files outside of class declarations, and records the signatures in the project database 106. The class's type records and signatures are then available to the compiler 102 for change detection during a subsequent build of the user's project.

The compiler 80 performs change detection based on the type records and signatures stored in the project database 106 from preceding builds of the user's project. Those header files that have changed since the user's project was last built are recompiled according to a procedure illustrated in FIGS. 6A and 6B and described in more detail below. In compiling each changed header file, the compiler 80 generates a new type record for each class declaration in the changed header file, and new signatures for the contents of the header file outside of the header file's class declarations. The compiler 80 then compares the new type records and new signatures to those stored in the project database 106 from the last build of the user's project. Based on these comparisons, the compiler 80 notifies the minimal rebuild engine 102 of the changes to the header file's class declarations and whether changes were made outside of the class declarations.

In addition to the types of edits to a class declaration that are reported by the class wizard in the first exemplary embodiment, the compiler 80 in the second exemplary embodiment also detects the following types of class declaration edits: (1) add a new virtual function; (2) changes to class declaration formatting, comments, etc.; and (3) edits to inline member function bodies.

Some statements that may be encountered in a header file class declaration can be changed without affecting the class's type record. These statements are categorized herein as either "rude areas" or "dangerous areas" of a class declaration. A statement (or portion thereof) in a class declaration is categorized herein as a rude area when an edit to the statement (or portion) may affect compilation of any source code file that includes the header file which contains the class declaration. For example, a macro definition (using a #define statement) in a class declaration may not affect the class's structure, but may affect any object code file that is compiled from the header file in which the class declaration appears. In the second exemplary embodiment, the compiler 80 treats changes to rude areas as changes outside of class declarations. More specifically, the compiler 80 utilizes signatures rather than type records to detect changes to these class declarations, and reports any change to these class declarations as if a change outside of the header file's class declarations. Accordingly, when the compiler 80 detects a change to a rude area in a class declaration of a header file, any source code that includes the header file is recompiled.

On the other hand, a statement (or portion thereof) in a class declaration is categorized herein as a dangerous area when an edit to the statement (or portion) may affect object code files with a dependency on the class, but not object code files with no dependency on the class. An example of a dangerous area is a default argument in a function of a class. A default argument specifies a value that is to be passed to a function if none is specified by the programmer. The presence, absence, and value of default arguments is not encoded in the type record of a class. If a default argument of a function in a class declaration is changed, object code files that have some dependency on the class may be affected. Object code files with a dependency on the header file, but not on the class are not affected. In the second exemplary embodiment, the compiler 80 also utilizes signatures to detect changes to dangerous areas in a class declaration, and reports these changes to the minimal rebuild engine 102 as changes that affect any dependency of the object code files on the class. Accordingly, when the compiler 80 detects a change to a dangerous area in a class declaration of a header file, any source code that includes the header file and uses the class declaration is recompiled.

As described above, the project database 106 provides persistent storage of change and dependency information for the minimal rebuild engine 102, as well as storage of type records and signatures for the compiler 80. The project database 106 preferably stores information as one or more disk files in the secondary storage 42 (FIG. 1). In addition to the project database 106, the minimal rebuild system 100 may maintain other information in any number of additional files.

The minimal rebuild engine 102 further combines the change and dependency information provided by the class wizard 110 and/or compiler 80 to determine which of the object code files 82 are to be recompiled (and conversely, which recompilations to omit) when the user's project is rebuilt. The minimal rebuild engine 102 makes this determination by calculating the intersection of the changes to the header files 62 and the dependencies of the object code files 82 on the header files 62. If the changes made to a header file intersect the dependencies of an object code file on the header file (meaning that the change could affect the object code file), then the object code file is recompiled. If there is no intersection of the changes with the object code file's dependencies on its header files (indicating the change cannot affect the object code file), then the object code file is not recompiled. As a result of these determinations, the minimal rebuild engine 102 informs the compiler driver 104 which of the object code files 82 to recompile.

The compiler driver 104 controls compiling of the object code files 82 by the compiler 80. The compiler driver 104 queries the minimal rebuild engine 102 which of the object code files 82 need recompiling. For the object code files 82 that need recompiling, the compiler driver 104 invokes the compiler 80. For object code files 82 that the minimal rebuild engine 102 determines recompilation can be avoided, the compiler driver 104 causes updating of such object code files' browser and debugger information.

Dependency analysis

Referring now to FIG. 5, the dependency analysis performed in the minimal rebuild system 100 (FIG. 3) (i.e., by the compiler 80) generates dependency information for the object code files 82 (FIG. 2) on a per class basis. Specifically, for each of the object code files 82 (e.g., x.obj), the minimal rebuild system 100 generates dependency information (e.g., D()) consisting of a set of classes (e.g., $C_1$, $C_2$, ..., $C_m$) on which the respective object code file depends, and a set of dependency types (e.g., $dType_1$, $dType_2$, ..., $dType_n$) of the object code file on each class in the set, as shown by the following expression:

$$D(x \cdot obj) = \{(c_1, \{dType_1, dType_2, \ldots, dType_{n1}\}),$$
$$(c_2, \{dType_1, dType_2, \ldots, dType_{n2}\}),$$
$$\ldots,$$
$$(c_m, \{dType_1, dType_2, \ldots, dType_{nm}\})\}$$

To minimize the storage requirements and processing time of the minimal rebuild system 100, the minimal rebuild system omits storing information of the object code file's class dependencies on some classes (hereafter "unchanging classes") that are not expected to change. Classes (e.g., MFC classes) provided by the code library 76, in particular, generally are changed only by the code library's provider, and not by the user of the development environment 52. From the user's perspective therefore, these unchanging classes do not change. In the exemplary embodiment, the minimal rebuild system 100 omits recording the object code files' class dependencies on the unchanging classes. Instead, the minimal rebuild system 100 recompiles all object code files 82 of the user's project that have a file dependency on a header file that contains any of the unchanging classes. This substantially reduces the class dependency information stored in the project database 106 for each of the object code files 82. In a typical project generated using the application wizard 72 (FIG. 2), the class dependency information is reduced by roughly a factor of 15. Class dependency information is similarly reduced for manually generated projects that use a class library.

In the exemplary embodiments, the compiler 80 identifies the unchanging classes on which class dependencies are not being tracked based on their inclusion in the object code file's compilands (e.g., the source code files 60 from which the object code file is compiled) from a common source or entry point. More specifically, the unchanging classes typically are contained in a small group of specific header files. For example, the header file "afx.h" contains a multitude of declarations for MFC classes in the code library 76. Declarations of unchanging classes typically also are contained in precompiled header files. Source code files 60 (FIG. 2) typically include these class declarations with a statement such as the following:

include <afx · h>

In the exemplary embodiment, the compiler 80 determines not to track class dependencies of classes that are included in an object code file's compilands with a "#include" statement from particular header files (e.g., afx.h and like header files of the code library 76). In alternative embodiments of the invention, the compiler 80 can determine which classes are static by explicitly marking the unchanging classes (such as by custom #pragma statements in the source code), or by virtue of the class being contained in a precompiled header file.

In the exemplary embodiments of the invention, the dependency types of an object code file on a class that are tracked by the minimal rebuild system 100 include dependencies on a search for a name in the scope of the class, a dependency on the shape of the class's data, and a dependency on the shape of the class's vtable. The set of these dependency types for each class is represented in an instance (hereafter the object code file's "dependencies data structure" on the class) of a data structure 120 which comprises a hash array 122, and flags 124–125. (Instances of the data structure 120 also are utilized by the minimal rebuild system 100 in tracking changes to classes as described below.) Dependencies on searches for names in the class are represented in the hash array 122. The preferred hash array 122 consists of 254 single bit entries, each corresponding to a particular hash result (i.e., 0 through 253). Dependencies on the shape of the class's data and vtable are represented in the flags 124 (the "data shape dependency flag"), and 125 (the "vtable shape dependency flag"). The preferred flags 124–125 are a single bit each. The dependency information for each of the object code files 82 (FIG. 2) includes a separate data structure 120 for each of the classes on which dependencies of the object code file are tracked. Accordingly, the minimal rebuild system 100 represents each object code file's set of dependency types on classes in 32 bytes (i.e., 256 bits) per class.

Each of the single bit entries in the hash array 122 can be set to a binary "1" to represent a dependency on a search for an "equivalent" name (i.e., a name whose hash function result is associated with the particular entry) in the scope of the data structure's respective class. As described above, dependency analysis for each object code file is performed by the compiler 80 (FIG. 3) and minimal rebuild engine 102 (FIG. 3) while that object code file is being compiled in a previous build of the user's project. During compiling into the object code file 82, the compiler 80 notifies the minimal rebuild engine 102 whenever the compiler 80 searches for a name in the scope of a class in a header file. The minimal rebuild engine 102 calculates a result of a hash function on the name. The minimal rebuild engine 102 then sets the single bit entry corresponding to the hash result (of the hash function calculation) in the hash array 122 of the object code file's data structure 120 which is associated with the class.

The hash function utilized in the preferred minimal rebuild system 102 is implemented in the C programming language code illustrated in the following Table 3. The result of the hash function is an index of an entry for the equivalent name in the hash array. The illustrated hash function yields a dispersed distribution of hash results in the hash array 122 for typical names encountered in class declarations. Many other hash functions which produce dispersed hash result distributions for names are known that can be suitably utilized in alternative embodiments of the invention.

TABLE 3

Preferred Hash Function Code

```
// front end hash function
typedef unsigned      hash_t;
typedef char const *  SZC;
inline hash_t
HashSz ( SZC sz ) {
    hash_t  h = 0;    // hash result
    unsigned char    tch;
    while (tch = *sz ) {
        h = (h >> 7) + (h << 2) + tch;
        sz++;
    }
    return h;
}
// hash_t value is mod'ed with the bit vector size
// to yield an index of an entry in hash array
inline unsigned
ModHashSz ( SZC sz, unsigned uMod ) {
    return HashSz ( sz ) % uMod;
}
```

To further minimize the storage requirements and processing time of the minimal rebuild system 100, the minimal rebuild system omits storing information of an object code file's dependency on a search for certain commonly used names in the scope of a class. When compiling a typical object code file, the compiler 80 searches for some common names in a large majority of classes. Some examples of such common names are the data type identifiers, "BOOL," "DWORD," "WORD," and the like. On the other hand, these common names are rarely introduced or removed from class declarations. When the compiler 80 searches for certain common names in compiling an object code file, the compiler 80 omits to set the bit corresponding to the equivalent name in the hash array 122. Instead, the minimal rebuild system 100 recompiles all object code files 82 of the user's project that have a file dependency on a header file that contains a class declaration in which any of these certain common names has been introduced or removed.

Turning now to the flags 124–125, the minimal rebuild system 100 sets the data shape dependency flag 124 to represent a dependency of the object code file 82 on the shape (i.e., the number, order and size) of data in the class. An object code file's dependency on the shape of data in a class is detected by the compiler 80 while compiling a compiland into the object code file that creates an object of the class or directly accesses the object's data. When the compiler 80 detects this data shape dependency, it notifies the minimal rebuild engine 102. In response, the minimal rebuild engine 102 sets the data shape dependency flag in the data structure 120 that represents the object code file's dependencies on the class.

The minimal rebuild system 100 sets the vtable shape dependency flag 125 to represent a dependency of the object code file 82 on the shape of the class's vtable. A vtable is an array containing pointers to locations of the class's virtual function members, and conventionally utilized as an interface for program code outside the class to access those members. The vtable has a shape determined by the number of pointers and their offsets (i.e., position) within the vtable. Code outside the class (e.g., in the object code files 82) accesses the class's members according to the offsets of their pointers within the vtable. Accordingly, an object code file which calls a class's member through its vtable generally has a dependency on the class's vtable. An object code file's dependency on the shape of a class's vtable is detected by the compiler 80 while compiling a compiland into the object code file that contains any call to a virtual function of the class. When the compiler 80 detects this vtable shape dependency, it notifies the minimal rebuild engine 102. In response, the minimal rebuild engine 102 sets the vtable shape dependency flag in the data structure 120 that represent's the object code file's dependencies on the class.

Change detection

Referring again to FIG. 3, in the first embodiment of the invention as discussed above, the class wizard 110 detects changes to class declarations, as well as changes outside class declarations, in the header files 62 (FIG. 2), and notifies the minimal rebuild system of the changes. This is done at the time the change is made to the class declaration. In response to the notification, the minimal rebuild system records the changes in the project database 106. Accordingly, when the user's project is next rebuilt, the project database 106 contains information as to the class dependencies of each of the object code files 82 (FIG. 2) and the changes in each of the header files 62. The minimal rebuild system 100 further detects whether the header files 62 have been modified other than by the class wizard 110, and records in the database 106 which header files 62 were modified outside the class wizard 110.

In the second embodiment of the invention discussed above, the compiler 80 detects changes to class declarations and outside of class declarations in the header files 62, and notifies the minimal rebuild engine 102 of the changes. The compiler 80 performs this change detection for the class declarations of a particular header file when compiling one of the source code files 60 that includes the header file. In response to the notification, the minimal rebuild system records the changes in the project database 106.

Referring once more to FIG. 5, the project database 106 (FIG. 3) utilizes an instance of the data structure 120 for each class (hereafter the class's "changes data structure") to record the changes to that class. (As described previously, instances of the data structure 120 also are utilized to record an object code file's dependencies on a class.) The data structure 120 preferably comprises a 254-bit hash array 122, and two single-bit flags 124–125. Accordingly, the project database 106 represents changes to the class declarations in the header files 62 in 32 bytes (i.e., 256 bits) per class.

In the exemplary embodiments of the invention, the changes to the class declarations of the header files 62 that are tracked by the minimal rebuild system 100 include changes to names used in the class declaration, the shape of the class's data, and the shape of the class's vtable. When the minimal rebuild engine 102 (FIG. 3) is notified by the class wizard 110 or the compiler 80 of a change to a class declaration, the minimal rebuild engine 102 sets appropriate entries in the hash array 122 or flags 124–125 of that class's instance of the data structure 120. More specifically, when a name in the class declaration is changed (e.g., the name is added to or removed from the class declaration), the minimal rebuild engine 102 records the change by calculating a result of the hash function on the name, and setting the single bit entry corresponding to the hash function result in the hash array 122 of the class's instance of the data structure 120. So that the recorded changes and class dependency types can be directly compared, the same hash function must be utilized for both recording changed names of class declarations and dependencies of object code files on searched-for names of class declarations.

On the other hand, when notified of a change to the shape of the data in a class declaration (such as from adding, removing, or changing types of the class's data items), the minimal rebuild engine 102 records the change by setting the data shape flag 124 in the class's instance of the data structure 120. When notified of a change to the shape of the vtable for a class (such as from adding or removing members of the class), the minimal rebuild engine 102 records the change by setting the vtable shape flag 125 in the class's instance of the data structure 120.

The project database 106 further records changes detected to the header files 62 outside of class declarations. These changes can be recorded, for example, in a data structure (not shown) having a single bit flag for each header file in the user's project.

Minimal rebuild process

Referring to FIG. 4, in the first exemplary embodiment of the invention, changes inside and outside of class declarations in the header files 62 are detected by the class wizard 110 and recorded in the project database 106 between builds of the user's project (as shown by change detection step 114). The dependencies of the object code files 82 on the class declarations are analyzed by the compiler and recorded in the project database 106 in a previous build of the user's project (as shown by dependency analysis step 112). Consequently, when the user again initiates the building process for the project, the change and dependency information is already available in the project database 106. The minimal rebuild system 100 responds to the user's initiating the subsequent build by comparing the dependencies for each object code file 82 on the header files 62 to the changes recorded in the project database 106 (as shown by comparison step 116). If the dependencies of a particular object code file on any header file intersect the changes to the header file, the object code file is recompiled. If the dependencies do not intersect the changes, the minimal rebuild system 100 omits recompiling that object code file (as shown at step 118).

To determine whether any of an object code file's dependencies on a header file intersect the changes to the header file, the minimal rebuild engine 102 retrieves the object code file's dependency data structures from the project database 106. As described above, the dependency data structures each represent the object code file's dependency types on a particular class declaration in the header files 62. For each dependency data structure, the minimal rebuild engine 102 also retrieves the changes data structure for the respective class from the project database 106. The minimal rebuild engine 102 then performs a bit-wise AND of each of dependency data structure with the corresponding class's changes data structure. A non-zero result indicates that the object code file's dependencies on a class intersect the changes to the class, whereas a zero result indicates that the intersection is nil.

The minimal rebuild engine 102 also checks whether any edits were made other than by the class wizard 110 to the object code file's included header files. The object code files 82 are considered dependent on any changes made to their included header files outside the class wizard 110. Accordingly, the object code file's dependencies intersect changes to its included header files if the changes information in the project database 106 indicate changes were made to the included header files other than by the class wizard 110.

In the second exemplary embodiment, dependencies of the object code files 82 also are analyzed by the compiler 80 and recorded in the project database 106 in a previous build of the user's project. However, changes to class declarations and to statements outside class declarations in the header files 62 are detected by the compiler 80 when compiling source code files that include the header files in a current build of the user's project (as opposed to the class wizard 110 utilized for change detection between builds in the first exemplary embodiment). Consequently, when the user initiates the current build of the project, the project database 106 contains dependency information, but not change information. Since the compiler 80 performs change detection 114 (FIG. 5) on the header files when a source code file that includes the header files is recompiled, some of the source code files must first be recompiled to make change information available for determining whether recompiling of the remaining source code files can be avoided.

Figure 6A:
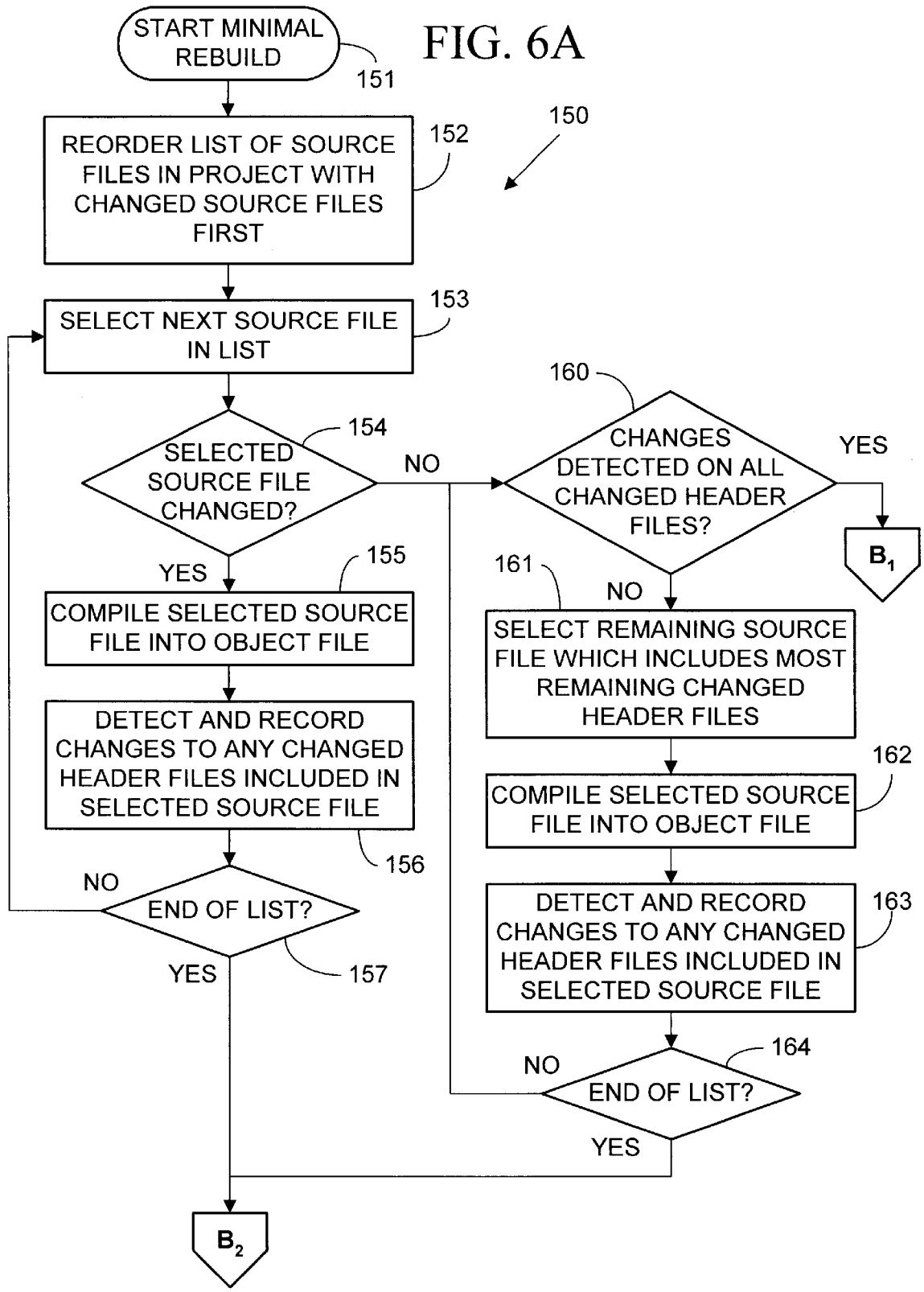
FIGS. 6A and 6B are a flow diagram of a minimal rebuild method according to the second exemplary embodiment of the invention.
Figure 6B:
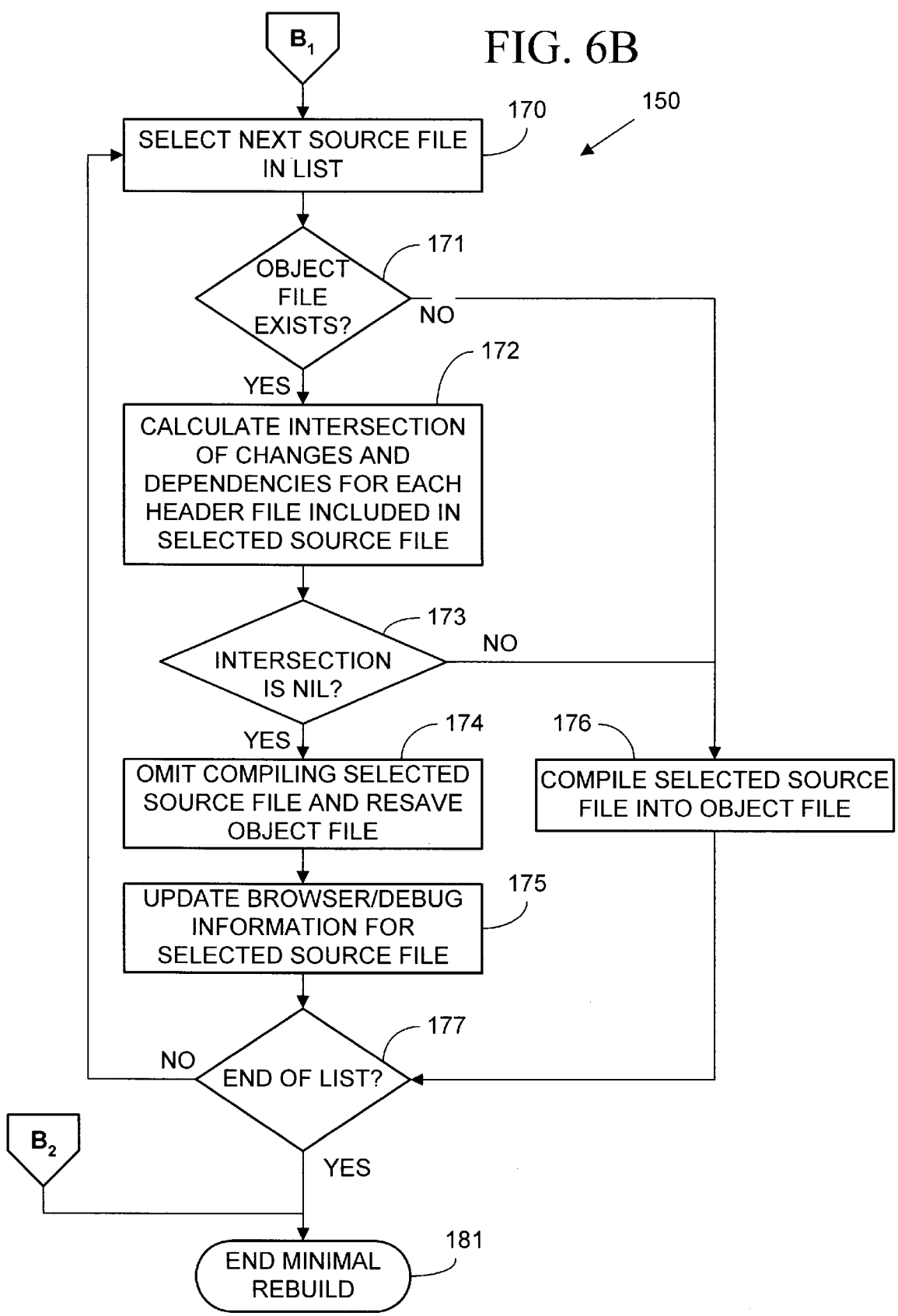

Referring now to FIGS. 6A and 6B, the minimal rebuild system 100 in the second exemplary embodiment of the invention utilizes minimal rebuild process 150 when the user initiates a rebuild of the user's project. In the minimal rebuild process 150, the minimal rebuild system 100 selectively recompiles the source code files 60 (FIG. 2) so as to detect changes to all header files 62 (FIG. 2) that were changed since the last build of the project. The minimal rebuild system 100 then utilizes the detected changes to the header files 62 to determine which of the remaining source code files 60 to recompile and which recompiles can be avoided.

In a first stage comprising steps 151–157 of the minimal rebuild process 150, the minimal rebuild system 100 first recompiles the source code files that were changed since the user's project was last built. The changed source code files must be recompiled regardless of any changes to the header files that they include. While compiling the changed source code files, the compiler 80 detects changes to the header files included by the changed source code files. The minimal rebuild system 100 utilizes the detected changes in a later stage of the minimal rebuild process 150 to avoid recompiling remaining unchanged source code files where possible.

At the start 151 of the minimal rebuild process 150, the minimal rebuild system 100 begins with a list of the source code files 60 in the project that are compiled to build its executable program 64. At step 152, the minimal rebuild system 100 reorders this list to place any source code files 60 that have changed since the user's project was last rebuilt first in the list. The minimal rebuild system 100 preferably determines which of the source code files 60 were changed since the user's project was last rebuilt by comparing the date stamp of each source code file 60 to that source code file's date stamp at the last successful build of the user's project (hereafter referred to as the "last known" date stamp of the source code file). For this comparison, the minimal rebuild engine 102 records the last known date stamps of the source code files during the last rebuild in the project database 106. The source code file is known to have changed since the project was last built if its current date stamp is later in time than the last known date stamp of the source code file recorded in the project database, or if there is no recorded last known date stamp for the source code file (e.g., in a case where a new source code file is added to the project since the last build).

At step 153, the minimal rebuild system 100 selects the next source code file in the reordered list, beginning from the top of the list. If the selected source code file was changed since the project was last built, the minimal rebuild system 100 recompiles the selected source code file as shown at steps 154–155. As the selected source code file is recompiled, the compiler 80 detects changes to any header files 62 that are included by the selected source code file as indicated at step 156. The compiler 80 notifies the minimal rebuild engine 102 of the changes, and the minimal rebuild engine 102 records the changes in the project database 106 as described above.

At step 157, the minimal rebuild system 100 checks for an end of list condition, i.e. whether the selected source code file is the last in the list indicating that all source code files are already recompiled. If not at the end of the list, the minimal rebuild process 150 repeats the first stage at steps 153–154 for the next source code file in the list.

The minimal rebuild process 150 continues from step 154 to a second stage comprising steps 160–164, if the selected source code file at step 154 in the first stage was not changed since the project was last built.

The minimal rebuild system 100 typically detects changes to most, if not all, of the header files 62 that were changed since the project was last built by recompiling only the changed source code files in the first stage 151–157 of the minimal rebuild process 150. However, the recompiling in the first stage 151–157 only detects changes to the changed header files that are included by the changed source files. Consequently, after the first stage 151–157, some of the changed header files (i.e., any of the changed header files that are not included by the changed source code files) may still require change detection. The minimal rebuild system 100 detects changes in any remaining changed header files in the second stage 160–164 of the minimal rebuild process 150 by recompiling one or more additional source code files that include the remaining changed header files.

At step 160, the minimal rebuild system 100 checks whether change detection has been performed on all changed header files. The minimal rebuild system 100 preferably determines which of the header files 62 were changed since the project was last built by comparing the date stamps of the header files to their last known date stamps (which also are recorded in the project database in the same manner as the last known date stamps of the source code files). If the date stamp of a header file is later in time than its last known date stamp or there is no last known date stamp recorded for the header file (e.g., the header file is new), then the header file was changed since the project was last compiled.

If change detection 114 (FIG. 4) has not been performed by the compiler 80 (FIG. 3) on any of the changed header files, the minimal rebuild system 100 selects a source code file from the list that has not yet been recompiled and includes the most remaining changed header files (i.e., the changed header files whose changes are not yet detected) at step 161. As shown at steps 162–163, the compiler 80 then recompiles the selected source code file and detects changes to the remaining changed header files included by the selected source code file. The compiler 80 also notifies the minimal rebuild engine 100 of the changes. In response, the minimal rebuild engine 100 records the changes in the project database 106.

At step 164, the minimal rebuild system 100 again checks for the end of list condition, i.e. whether all source code files are already recompiled. If not at the end of the list, the minimal rebuild process 150 repeats the second stage at step 160.

The minimal rebuild process 150 continues from step 160 to a third stage comprising steps 170–177 if the changes to all changed header files have been detected in the first and (possibly) second stages of the process 150. In the third stage, the minimal rebuild system 100 utilizes the dependency and change information now contained in the project database 106 to determine whether recompiling of the remaining source code files in the list (that are not yet recompiled) can be avoided.

At step 170, the minimal rebuild system 100 selects the next source code file in the list that is not yet recompiled. At step 171, the minimal rebuild system 100 checks whether the object code file that was compiled in a previous build of the project from the selected source code file still exists. If the object code file exists, the minimal rebuild system 100 at step 172 calculates the intersection of the object code file's dependencies with the detected changes to the header files included by the selected source code file. As described above, the intersection can be calculated by bit-wise AND operations on each of the object code file's class dependency data structures with the corresponding class's change data structure, and additionally checking for changes detected to statements outside class declarations in the header files and for "rude edits" (discussed above) made inside class declarations. The object code files are considered dependent on any changes to statements outside class declarations in their included header files, and on rude areas inside classes on which they otherwise depend. Accordingly, the object code file's dependencies intersect changes to its included header files if the changes information in the project database 106 indicate any changes were made to such statements outside class declarations and rude areas in class declarations in the object code file's included header files since the previous build of the user's project.

As shown at steps 173–175, if the intersection of the object code file's dependencies with the detected changes to the header files included by the selected source code file is nil or the empty set, the minimal rebuild system 100 omits recompiling the selected source code file. The minimal rebuild system 100 has determined that the header file changes would not result in any changes to the object code file compiled from the selected source code file. To reflect that the object code file for the selected source code file is still current, the minimal rebuild system 100 resaves the object code file causing its date stamp to be updated. The minimal rebuild system 100 also updates browser and debug information for the selected source code file at step 175.

On the other hand, if no previously compiled object code file exists for the selected source file at step 171 or the intersection of the object code file's dependencies and the header file changes is not nil at step 173, the minimal rebuild system 100 recompiles the selected source code file at step 176. Since the object code file's dependencies and the header file changes intersect, the minimal rebuild system 100 determines that the header file changes may affect the object code file compiled from the selected source code file.

At step 177, the minimal rebuild system 100 again checks for the end of list condition, i.e. whether all source code files are already recompiled or had recompiling omitted. If not at the end of the list, the minimal rebuild process 150 repeats the third stage at step 170 for the next remaining source code file in the list.

The minimal rebuild system 100 continues from the steps 157, 164 or 177 to a fourth stage comprising step 180 when the end of list condition is met (i.e., that all source code files have been processed and either recompiled or had recompiling omitted). At step 180, up-to-date object code files have been compiled or exist from a previous build for all the source code files in the list. This completes the minimal rebuild process 150 at step 181. After completing the minimal rebuild process 150, the object code files can be linked together by the development environment 52 using any of a variety of conventionally known methods to form one or more executable programs as directed by the user.

Having described and illustrated the principles of our invention with reference to exemplary embodiments, it will be recognized that the exemplary embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the exemplary embodiments shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a system for building a program executable on a computer, a method of minimizing rebuilding of the program following a revision, the method comprising the steps of:

when building the program prior to the revision, compiling a source code file and at least one header file included by the source code file into an object code file;

analyzing dependencies of the object code file on classes declared in the at least one header file;

generating dependency data which approximates the dependencies of the object code file on the classes;

detecting changes to the classes from the revision;

generating change data relating to the changes to the classes;

calculating an intersection of the dependency data with the change data;

recompiling the source code file except when the intersection is nil and when the source code file is unchanged in the revision.

2. The method of claim 1 wherein the step of analyzing dependencies of the object code file on classes comprises the step of:

analyzing dependencies of the object code file on searches for names in a scope of each class declared in the at least one header files.

3. The method of claim 1 wherein the step of analyzing dependencies of the object code file on classes comprises the step of:

analyzing dependencies of the object code file on a shape of data for each class declared in the at least one header files.

4. The method of claim 1 wherein the step of analyzing dependencies of the object code file on classes comprises the step of:

analyzing dependencies of the object code file on a shape of a virtual function table for each class declared in the at least one header files.

5. The method of claim 1 further comprising the steps of:

detecting changes to statements that are outside class declarations in the at least one header file from the revision; and determining that the dependency data and the change data have a non-nil intersection if the statements are changed from the revision.

6. The method of claim 1 further comprising the steps of:

detecting changes to rude areas in class declarations in the at least one header file from the revision; and determining that the dependency data and the change data have a non-nil intersection if the rude areas are changed from the revision.

7. The method of claim 1 further comprising the steps of:

omitting to analyze the dependencies of the object code file on classes declared in any of the at least one header files that are included by the source code file from a code library; and always recompiling the source code file if said any header file is changed from the revision.

8. The method of claim 1 further comprising the step of:

for each of the classes declared in the at least one header file, recording a set of dependency types of the object code file on the respective class including dependencies on searches for equivalent names in the scope of the respective class, a dependency on a shape of data for the respective class, and a dependency on a shape of a virtual function table for the respective class.

9. The method of claim 8 further comprising the step of:

for each of the class declared in the at least one header file, recording a set of changes to the class from the revision including changes to the equivalent names in the respective class, a change to the shape of data for the respective class, and a change to the shape of the virtual function table for the respective class; and wherein the step of calculating the intersection comprises comparing the set of dependency types to the set of changes for each of the classes.

10. A computer-readable storage medium having stored thereon instructions executable in a computer for performing the steps of the method recited in claim 1.

11. A system for minimizing rebuilding of a program for execution on a computer, comprising:

a compiler operative to compile a source code file and any header files included by the source code file into an object code file, and to analyze at least one type of dependency of the object code file being compiled on classes declared in said header files to yield any class dependencies of the object code file on the classes;

a change detector for detecting at least one type of change made to the classes to yield any class changes;

a minimal rebuild engine in communication with the compiler and the change detector for receiving the class dependencies from the compiler and the class changes from the change detector, the minimal rebuild engine being operative to compare the class dependencies and the class changes to determine whether the class dependencies of the object code file intersect the class changes; and a compiler driver in communication with the compiler and the minimal rebuild engine and operative to cause the compiler to compile a plurality of source code files for first building the program, and further operative to cause recompiling by the compiler of a subset of the source code files for rebuilding the program, wherein the subset of the source code files excludes the source code files that are unchanged since first building the program and that were compiled into object code files whose class dependencies do not intersect the class changes.

12. The system of claim 11 wherein the change detector comprises:

an automatic source code generator operative to generate source code declarations in said header files for a selected one of a group of modifications to the classes declared in said header files responsive to user input, and further operative to yield the class changes that result from modifying the classes to the minimal rebuild engine.

13. The system of claim 11 wherein the change detector comprises:

means in the compiler for recording type information that represents the structure of the classes when compiling a source code file that includes the header files in which the classes are declared; and means in the compiler for comparing the type information of the classes recorded when compiling the source code files for first building the program to the type information of the classes recorded when compiling the subset of the source code files for rebuilding the program to yield the class changes.

14. The system of claim 13 wherein the change detector comprises:

means in the compiler for detecting changes to the classes that are not reflected in their type information; and the minimal rebuild engine being operative to determine that the class dependencies of the object code file intersect the class changes if the object code file's class dependencies include any dependency on any of the classes having changes that are not reflected in their type information.

15. In a compiler, a method of minimizing rebuilding of an executable program, comprising the steps of:

storing information indicative of any dependencies of an object module on any of a plurality of classes declared in any header files used in last compiling the object module;

detecting any changes made since last compiling the object module to said any header files and to any source files that were used in last compiling the object module; and recompiling the object module except at least where said detected changes are solely to parts of said classes which are not indicated by the stored information as dependencies of the object module.

16. The method of claim 15 wherein the step of storing information indicative of the object module's dependence on said any classes comprises the step of omitting to store information indicative of the object module's dependence on selected classes that are deemed unlikely to change, and the method further comprises the step of:

where change is detected to said selected classes, recompiling the object module.

17. The method of claim 15 wherein the step of storing information indicative of the object module's dependence on said any classes comprises the step of storing information indicative of any names searched for within each of said any classes' respective scope, and the method further comprises the step of:

where said detected changes are solely to names in said any classes that are not indicated by the stored information, omitting to recompile the object module.

18. The method of claim 17 wherein the step of storing information indicative of said any names searched for in a class declaration comprises for each of said any searched for names the steps of:

applying a hashing function to said each searched for name to yield a hash result; and storing information indicative of the hash result.

19. The method of claim 18 further comprising the step of:

hashing a name changed in a declaration of a class to yield a hash result;

comparing the hash result for the changed name to the stored information to thereby determine whether said detected changes are solely to names in said any classes that are not indicated by the stored information.

20. A computer-readable storage medium having stored thereon instructions executable in a computer for performing the steps of the method recited in claim 17.

21. The method of claim 18 wherein the step of storing information indicative of said any searched for names comprises the steps of:

forming for each of said any classes an array having a plurality of entries associated one-to-one with a plurality of hash results;

applying a hashing function to each of said any names searched for in said each of said any classes to yield a hash result for each of said searched for names; and storing information in the entry associated with the hash result indicative of the searched for name having the hash result.

* * * * *

UNITED STATES PATENT AND TRADEMARK OFFICE
CERTIFICATE OF CORRECTION

PATENT NO. : 5,854,932
DATED : December 29, 1998
INVENTOR(S) : Mariani, et al

It is certified that error appears in the above-identified patent and that said Letters Patent is hereby corrected as shown below:

| Col./Line | Error Reads | Should Read |
|---|---|---|
| 12/40 | D (x·obj) | D (x.obj) |
| 13/14 | <afx·h> | <afx.h> |
| 13/52 | "1" | "1" |
| 23/13 | claim 17 | claim 19 |

Signed and Sealed this

Seventh Day of December, 1999

Attest:

Q. TODD DICKINSON

Attesting Officer

Acting Commissioner of Patents and Trademarks